Patented May 8, 1951

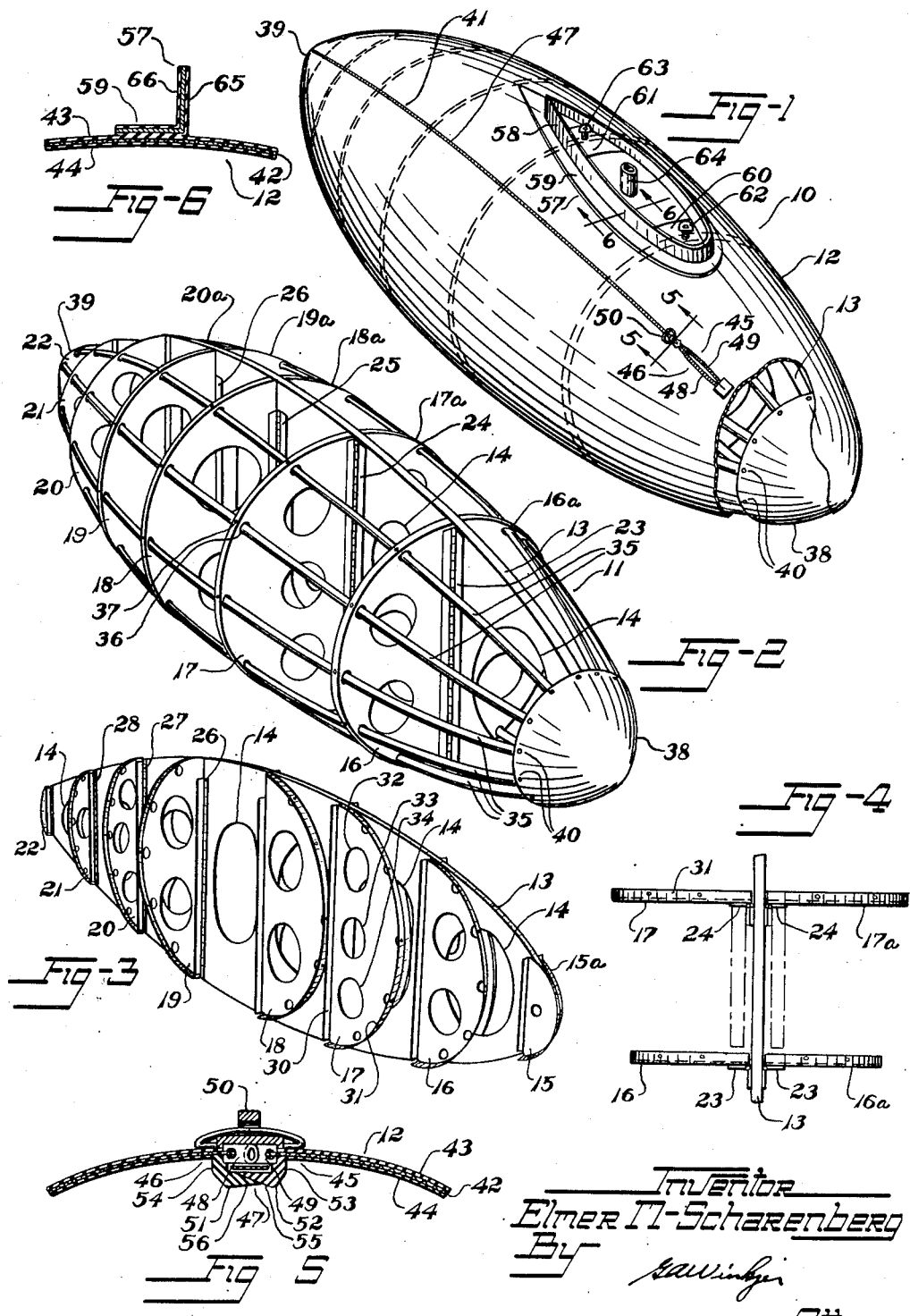

2,552,119

UNITED STATES PATENT OFFICE 2,552,119

COLLAPSIBLE FUEL TANK FOR AIRCRAFT

Elmer M. Scharenberg, Cuyahoga Falls, Ohio, assignor to The B. F. Goodrich Company, New York, N. Y., a corporation of New York Application April 4, 1946, Serial No. 659,586

5 Claims. (Cl. 150—0.5)

The invention relates to fluid containers having flexible walls and especially to auxiliary fuel tanks for aircraft and other vehicles.

Heretofore, on some aircraft flights, it has been customary to carry one or more auxiliary fuel tanks, usually of rigid steel or aluminum shell construction, suspended from racks or special fittings underneath the wings, for example, which tanks have been dropped from the aircraft, when desired. Ordinarily the tanks have never been recovered; hence each extended flight has meant the loss of one or more expensive metal tanks, which have needed replacement before another flight is undertaken. Prior metal tanks being of non-collapsible construction have required substantial precious space in shipment to desired locations.

Objects of the invention are to provide for containing fluids, especially liquids such, for example, as water, gasoline, kerosene and fuel oil, in a fluid-tight manner in a container having flexible walls and being of a portable and, if desired, disposable character; to provide for maintaining the shape of the container despite a collapsible nature of the walls of the container; to provide for internally supporting and maintaining the shape with or without liquid in the container; to provide an improved container for auxiliary fuel tank and other purposes which can be shipped in "knockdown" or collapsed condition so as to occupy a minimum amount of shipping space; to provide for convenience of assembly of the container at the place of use; to provide for economy of materials, simplicity of construction and convenience of manufacture; and to provide for effectiveness of operation.

More specific objects are to provide for improved construction of disposable fuel tanks of streamlined form for aircraft; to provide for effecting and maintaining the aerodynamic shape of the container having a flexible outer covering; to provide for covering and sealing the container in a single manipulating operation; and to provide for convenience of transportation, handling and use.

These and other objects and advantages of the invention will be apparent from the following description.

In the drawings, which form a part of this specification, and in which like numerals are employed to designate like parts throughout the same, Fig. 1 is a perspective view from the front and above of an auxiliary fuel tank for aircraft, parts being broken away and in section;

Fig. 2 is a perspective view from the front and above showing an internal supporting frame structure of the tank with the covering removed;

Fig. 3 is a perspective view from the front and above of a bulkhead-cross element arrangement of the frame structure, the cross elements being in a folded condition;

Fig. 4 is a plan view showing a mounting of the cross elements to the bulkhead, broken lines indicating the folded condition of the cross elements, parts being broken away;

Fig. 5 is a section on an enlarged scale taken along line 5—5 of Fig. 1 showing a sealing slide fastener closure for the opening in the covering of the tank; and Fig. 6 is a section taken along line 6—6 of Fig. 1 showing an attachment fitting of the tank.

In the illustrative embodiment of the invention shown in the drawings, an auxiliary fuel tank construction 10 includes a skeleton or supporting frame structure 11 of lightweight strong material such, for example, as aluminum or magnesium alloy, plywood, laminated fibre material, or other suitable material, and a fluid-tight envelope or covering 12 of flexible and impervious material such, for example, as reinforced or unreinforced rubber-like material. The structure 11 and covering 12 provide a streamlined or other suitable shape for the particular vehicular application.

The supporting frame structure 11 includes a central bulkhead 13 extending vertically and longitudinally of the tank substantially from the nose to the tail of the streamlined form along the median axis of the latter. The bulkhead may be of one-piece stamped sheet metal or of other suitable construction providing a truss-like structure having the desired strength, stiffening and resistance to distortion characteristics. The bulkhead 13 may be provided with a plurality of spaced-apart apertures 14, 14 suitably arranged for lightening purposes and for facilitating the free passage of fuel between opposite sides of the bulkhead, while avoiding objectionable lateral surging of the fuel within the tank.

A plurality of cross elements 15 to 22, inclusive, are disposed at one side of the bulkhead 13 in longitudinally spaced-apart relation to one another, and a second plurality of cross elements 15a to 22a, inclusive, are similarly disposed at the other side of the bulkhead and may be, in the extended condition, in register in the same laterally extending planes with the first said plurality of cross elements. Each of the cross elements may be of one-piece, stamped sheet metal construction shaped to provide the desired form of lateral cross-section of the tank at the respective stations of attachment of the cross elements to the bulkhead for effecting especially the desired streamlined form.

Each cross element may be swingingly or hingedly mounted to the bulkhead by a piano-type hinge connection 23 to 29 or other suitable movable connection secured to the bulkhead and to the cross element for facilitating the desired folded condition of the cross elements adjacent and along the bulkhead, as shown especially in Figs. 3 and 4. Each cross element may be provided with a base flange such, for example, as at 30 and a rim flange, as at 31, of the cross element 17, and may be provided with one or more apertures, as at 32, 33, 34 of the cross element 17, for lightening and anti-surging purposes, while permitting substantially free communication throughout the length of the tank.

The cross elements extend substantially the full width of the bulkhead at the respective stations of attachment to the latter, when in the extended condition, and may lie in the same laterally vertical plane perpendicular to the median axis of the tank, as shown especially in Fig. 4. The arrangement facilitates the provision of the desired stiffness of the supporting structure 11 and the desired continuity of streamlined form throughout the extent of the tank.

The supporting frame structure 11 includes a plurality of removable, circumferentially spaced-apart and shaped stiffener or stay elements 35, 35 extending longitudinally of the tank continuously between and terminating at the end cross elements 15, 15a and 22, 22a of the tank. The stay elements 35, 35 may be tubular or generally U-shaped or other suitable shape in cross-section, and each stay may extend through a relatively close-fitting aperture in each cross element adjacent the rim flange as at 36 of the cross element 17. Each stay may be further secured to each cross element by a suitable screw fastener 37 engaging the material of the stay and the cross element, although, if desired, other suitable mounting and attachment of the stays may be provided.

The removable stays 35, 35 may be conveniently assembled with the bulkhead-cross element arrangement or sub-assembly at the place of use. The construction effectively braces and unites the respective parts of the supporting frame structure 11 providing a substantially stiff and relatively rigid structure, the stays coacting with the bulkhead and cross elements to assure maintaining the desired continuity of streamlined form despite the collapsible nature of the covering material.

End caps 38, 39 of streamlined dome-shape under the covering 12 project axially outward beyond the end cross elements 15, 15a and 22, 22a for the extended condition of the latter and are separably attached to the structure 11 as by suitable screw fasteners 40, 40. The end cap 38 at the front of the structure 11 resists effectively inward bulging of the covering 12 under the impact forces of the air on the tank. The end cap 39 at the rear resists effectively distortion of the covering under negative forces of the axially flowing air. This end arrangement assures maintenance of the streamlined form even at high speeds.

The envelope or covering 12 is constructed and arranged to fully enclose the supporting frame structure 11 including the end caps 38, 39, and is positionable upon the structure 11 in a relatively taut condition, after the assembly of the structure from the respective "knock-down" parts. The covering is provided, desirably at its upper region, with an elongated opening 41 extending along the covering and preferably extending throughout the major portion of the length of the covering for facilitating admission of the structure 11 therethrough.

The covering may be constructed of three superimposed layers of cord fabric, these three layers being shown as a composite group 42, each layer being coated and preferably impregnated with a suitable material such as natural rubber or other rubber-like material, two of the layers having the cords running generally circumferentially of the covering and the other layer having the cords running generally longitudinally of the covering. The covering 12 may, if desired, have an outer layer 43 of rubber-like material having age and abrasion-resisting characteristics, and, preferably, has an inner relatively thin layer 44 of rubber-like material highly resistant to deterioration by hydrocarbon mixtures such, for example, as gasoline.

The covering 12 is patterned to fit snugly and conformingly to the streamlined contour of the supporting frame structure 11, and the fabric and rubber parts thereof are preferably united as by vulcanization.

For detachably securing adjacent margins 45, 46 of the opening 41 while effectively sealing the opening 41 in a fluid-tight manner, in addition to assuring holding the covering in the closed and taut condition upon the supporting frame structure 11, as contrasted with the looser condition of the flexible covering prior to complete closure thereof on the frame structure, a sealing closure 47, preferably of the slide fastener type, is provided. The closure 47 includes a series of cooperating teeth or fastener elements 48, 49 attached to and extending along the adjacent margins 45, 46 and a runner 50 operable at the exterior of the covering for engaging and disengaging the fastener elements.

For effecting sealing, sealing elements 51, 52 of resilient rubber or other rubber-like material may be mounted at the margins 45, 46 at the inside of the covering. The sealing elements 51, 52 may be of generally L-shape in cross-section providing base portions 53, 54 mounted in part directly upon and bridging the fastener elements and also in part upon the adjacent margins 45, 46, and providing portions 55, 56 extending laterally from the base portions toward each other and tapering to edges for sealing by lip-action, as shown especially in Fig. 5.

The construction and arrangement of the covering advantageously permits inserting the supporting frame structure 11 within the covering, and conveniently closing and sealing the opening 41 in a single manipulating operation providing a fluid-tight container.

An attaching assembly 57 of streamlined shape adapted to conform to the curvature of the outer surface of the fuel tank facilitates attaching the tank to the racks or other special fittings of the vehicle. The attaching assembly 57 includes a shroud or flanged metal frame 58 of generally L-shape in cross-section having a base portion 59 for seating against the outer surface of the covering 12 and being desirably adhesively attached thereto as by a suitable cement such, for example, as air-curing rubber cement. The assembly 57 also includes bridging or strut members 60, 61 of metal rigidly secured to and positioned transversely of the streamlined frame 58, which bridging members may have threaded apertures therein for receiving threaded attaching parts 62, 63 adapted to engage the racks or special fittings and also the bulkhead through the covering in sealing relation with the latter. A suitable pipe 64 in communication with the interior of the tank through the covering 12 facilitates removing fuel from the tank. For facilitating the adhesive attachment of the assembly 57 to the covering and for protective purposes, the metal components 58, 60, 61 of the assembly may be coated with suitable rubber-like material as at 65, 66.

The arrangement of the attaching assembly 57 and its mounting to the supporting frame structure 11 and covering 12 is such that the fuel tank may be conveniently and securely attached to the aircraft, while at the same time facilitating the rapid disengagement of the tank from the aircraft.

In shipment of the fuel tank, the bulkhead-cross element sub-assembly may be arranged in a folded condition, as shown especially in Fig. 3. The stays 35, 35, the end caps 38, 39, the covering 12, and the attaching assembly 57 in "knock-down" condition and the sub-assembly may be compactly arranged and packaged in a unitary shipping container. The space occupied by the complete "knock-down" kit of parts for the fuel tank is of comparatively small extent relative to that occupied by the non-collapsible metal tanks heretofore used, thus facilitating the shipment of several fuel tanks rather than merely one in the space occupied by prior constructions.

Variations may be made without departing from the scope of the invention as it is defined in the following claims.

I claim:

1. A collapsible supporting frame structure adapted to be assembled as a unitary structure constituting the entire support frame of a container for fluids, said structure comprising a bulkhead extending along said container intermediate opposite sides and between ends of the latter, and a plurality of cross elements spaced-apart between said ends extending transversely of said bulkhead and mounted in a swingable manner at said bulkhead, said cross elements being swingable from a position along said bulkhead to a position projecting laterally of said bulkhead for supporting a covering having an opening therein for admitting said structure as a whole in its assembled unitary condition therethrough and having separable means for closing said opening after insertion of said structure in said condition to maintain the shape of the container despite the collapsible character of said covering.

2. A collapsible supporting frame structure as defined in claim 1 in which said bulkhead extends along said container intermediate and in spaced relation to the sides of the container substantially from end to end of the latter, and in which said cross elements are disposed at each side of said bulkhead with adjacent cross elements at the opposite sides of said bulkhead member positionable in aligned pairs and in substantially the same transverse plane laterally of the container providing continuity of support of said covering about the transverse periphery of the container at said cross elements.

3. A collapsible supporting frame structure as defined in claim 1 in which said supporting frame structure includes a plurality of removable stay elements circumferentially spaced-apart extending along the container from cross element to cross element in spaced relation to said bulkhead and in bracing relation with said cross elements.

4. A fluid container comprising a collapsible supporting frame structure adapted to be assembled as a unitary structure constituting the entire support frame of the container, and a covering of impervious flexible material substantially enclosing and supported in taut condition directly by said structure, said covering having adjacent margins defining an opening extending along the covering for admitting said structure as a whole in its assembled unitary condition therethrough and said covering having sealing closure means including a slide fastener and a pair of sealing elements mounted at said margins for detachably joining said margins so as to maintain the covering in the taut condition and closing said opening against leakage of the fluid, and said covering having a shape and size relative to said structure such as to be brought from a relatively loose condition to a taut form-fitting condition thereon by closure of said slide fastener, and said supporting frame structure comprising a bulkhead extending along said container intermediate opposite sides substantially from end to end of the container and comprising a plurality of cross elements spaced apart along said frame structure and disposed at each side of said bulkhead with cross elements at opposite sides of said bulkhead mounted in transversely aligned pairs at said bulkhead and hinged thereto for collapse of the frame structure, the cross elements of each pair being positioned in substantially the same transverse plane laterally of the container providing continuity of support of said covering in said taut form-fitting condition about the transverse periphery of the container for maintaining the shape of the container despite the collapsible character of the covering, said cross elements being swingable to a position along said bulkhead in the collapsed condition of said frame structure.

5. A fluid container as defined in claim 4 in which said bulkhead, said cross elements, and said covering are constructed and arranged to provide a streamlined shape of the container, and in which said supporting frame structure includes a plurality of removable stay elements circumferentially spaced-apart extending along the container from cross element to cross element in spaced relation to said bulkhead and in bracing relation with said cross elements facilitating supporting said covering in taut condition along the container and maintaining the shape of the container despite the collapsible character of the covering, and in which said covering has a streamlined shape and size relative to said structure such as to be brought from a relatively loose condition to a taut form-fitting condition thereon by closure of said slide fastener.

ELMER M. SCHARENBERG.

REFERENCES CITED

The following references are of record in the file of this patent:

UNITED STATES PATENTS

| Number | Name | Date |
|---|---|---|
| 1,392,892 | Imber | Oct. 4, 1921 |
| 1,791,889 | Duncan | Feb. 10, 1931 |
| 2,107,216 | Rogers | Feb. 1, 1938 |
| 2,175,949 | Allen | Oct. 10, 1939 |
| 2,358,653 | Mock | Sept. 9, 1944 |
| 2,361,743 | Butler | Oct. 31, 1944 |
| 2,381,402 | Weber et al. | Aug. 7, 1945 |

FOREIGN PATENTS

| Number | Country | Date |
|---|---|---|
| 528,142 | France | Aug. 10, 1921 |
| 583,873 | Great Britain | Aug. 20, 1941 |